(12) United States Patent
Kool

(10) Patent No.: US 10,542,722 B2
(45) Date of Patent: Jan. 28, 2020

(54) METHOD AND MANAGING DAIRY ANIMALS, AND A MILKING SYSTEM FOR PERFORMING THE SAME

(71) Applicant: Lely Patent N.V., Maassluis (NL)

(72) Inventor: Pieter Neelus Kool, Berkenwoude (NL)

(73) Assignee: Lely Patent N.V., Maassluis (NL)

( * ) Notice: Subject to any disclaimer, the term of this patent is extended or adjusted under 35 U.S.C. 154(b) by 482 days.

(21) Appl. No.: 15/129,541

(22) PCT Filed: Mar. 13, 2015

(86) PCT No.: PCT/NL2015/050159
§ 371 (c)(1),
(2) Date: Sep. 27, 2016

(87) PCT Pub. No.: WO2015/152710
PCT Pub. Date: Oct. 8, 2015

(65) Prior Publication Data
US 2017/0172101 A1 Jun. 22, 2017

(30) Foreign Application Priority Data
Apr. 1, 2014 (NL) ...................................... 2012538

(51) Int. Cl.
*A01J 5/00* (2006.01)
*A01J 5/007* (2006.01)
(Continued)

(52) U.S. Cl.
CPC ................. *A01J 5/007* (2013.01); *A01J 5/01* (2013.01); *A01J 5/017* (2013.01); *A01J 5/0131* (2013.01);
(Continued)

(58) Field of Classification Search
CPC .. A01J 5/007; A01J 5/01; A01J 5/0131; A01J 5/0132; A01J 5/013; A01K 1/12; A01K 1/123; A01K 1/126
(Continued)

(56) References Cited

U.S. PATENT DOCUMENTS 3,679,365 A * 7/1972 Zehnder Hans et al. ...................
A01J 5/0131
436/22
4,485,763 A * 12/1984 Icking ....................... A01J 7/00
119/14.17
(Continued)

FOREIGN PATENT DOCUMENTS

| WO | 00/27183 A1 | 5/2000 |
|---|---|---|
| WO | 02/100164 A1 | 12/2002 |
| WO | 2007/108737 A1 | 9/2007 |

OTHER PUBLICATIONS

International Search Report dated Oct. 5, 2015 in PCT/NL2015/050159 filed Mar. 13, 2015.

*Primary Examiner* — Tien Q Dinh
*Assistant Examiner* — Ebony E Evans
(74) *Attorney, Agent, or Firm* — Oblon, McClelland, Maier & Neustadt, L.L.P.

(57) ABSTRACT

A method, and milking system, for managing a herd of dairy animals including N groups, wherein N≥2, and the method includes: A) determining a content of a substance in the milk for a group of dairy animals, and B) performing an animal-related operation for the group, based on the content of the determined substance.

14 Claims, 1 Drawing Sheet

(51) Int. Cl.
*A01J 5/013* (2006.01)
*A01J 5/04* (2006.01)
*A01J 5/01* (2006.01)
*A01J 5/017* (2006.01)
*A01J 9/00* (2006.01)
*A01K 1/12* (2006.01)
*A01K 5/02* (2006.01)
*A01K 11/00* (2006.01)

(52) U.S. Cl.
CPC .................. *A01J 5/045* (2013.01); *A01J 9/00* (2013.01); *A01K 1/126* (2013.01); *A01K 5/02* (2013.01); *A01K 11/006* (2013.01)

(58) Field of Classification Search
USPC .............................................. 119/14.2, 14.08
See application file for complete search history.

(56) References Cited

U.S. PATENT DOCUMENTS

| | | | |
|---|---|---|---|
| 5,743,209 A * | 4/1998 | Bazin | A01J 5/007 |
| | | | 119/14.08 |
| 6,197,538 B1 * | 3/2001 | van den Berg | A01J 5/01 |
| | | | 422/50 |
| 6,823,817 B2 * | 11/2004 | van den Berg | A01J 5/007 |
| | | | 119/14.02 |
| 7,155,345 B1 | 12/2006 | Arnvidarson | |
| 2002/0124803 A1 * | 9/2002 | Chen | A01J 5/01 |
| | | | 119/14.08 |
| 2002/0148408 A1 * | 10/2002 | Gompper | A01J 5/01 |
| | | | 119/14.14 |
| 2004/0154548 A1 * | 8/2004 | Eriksson | A01J 5/007 |
| | | | 119/14.08 |
| 2005/0233037 A1 * | 10/2005 | Bendtsen | G01N 15/042 |
| | | | 15/42 |
| 2007/0111205 A1 * | 5/2007 | Delwiche | A01J 5/0131 |
| | | | 435/6.1 |
| 2007/0272159 A1 * | 11/2007 | Francke | A01J 5/007 |
| | | | 119/14.14 |
| 2007/0289536 A1 | 12/2007 | Dunn et al. | |
| 2008/0121185 A1 * | 5/2008 | Tamminga | A01J 5/007 |
| | | | 119/14.02 |
| 2017/0006817 A1 * | 1/2017 | Loosveld | A01J 5/0131 |

\* cited by examiner

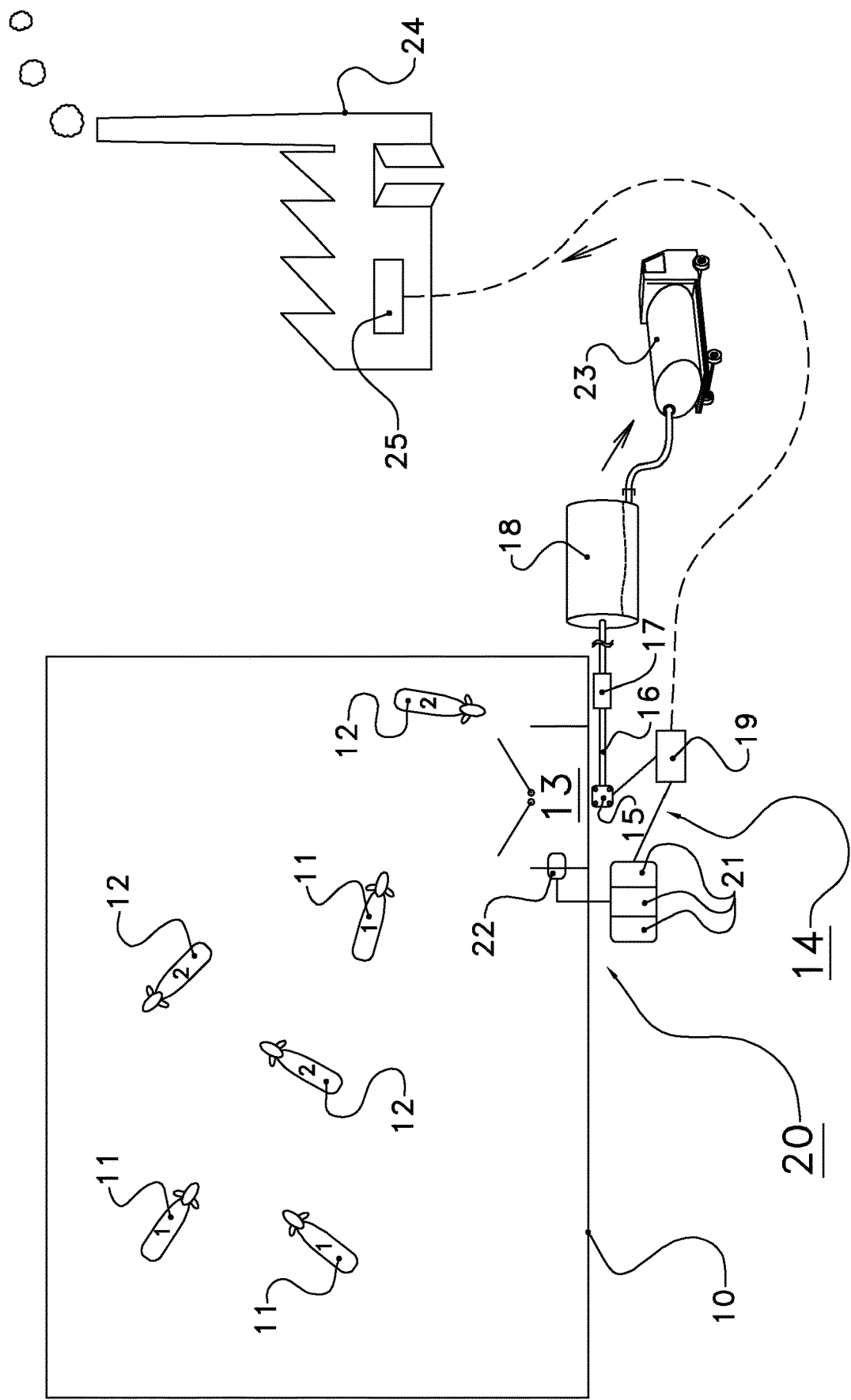

METHOD AND MANAGING DAIRY ANIMALS, AND A MILKING SYSTEM FOR PERFORMING THE SAME

In a first aspect, the present invention relates to a method of managing a herd of a plurality of dairy animals, which herd comprises N groups of each at least one animal, in which N≥2, the method comprising A) determining a content of a substance in the milk for at least one, and in particular each, group of dairy animals, and B) performing an animal-related operation for the at least one, in particular for each, group, based on the content of the substance determined in the milk of said group.

It is known per se to check the milk of a dairy animal, for example by measuring the contents of substances therein, in order to take measures, if required, on the basis of the contents measured. Examples of contents are fat and protein, because the payment of a dairy farmer for his milk is partly based thereon. However, not every cow (or other dairy animal) is the same, so an animal's characteristics will have to be taken in to account, at least to some degree, when he takes measures. It is known, for example, to take a milk sample from an animal at set times, in order to test it in the laboratory for its contents. However, this is only carried out once every few weeks to months, and would be very laborious and expensive if the frequency were higher. In addition, it always takes some time before the results are available.

Of course, it is also possible to incorporate analysing equipment into the milking machine. In this case, the fact that such equipment is not only complicated and expensive, but, in addition, often also delicate, is a drawback, and will not ensure a high degree of reliability in an environment as rough as that of a dairy farm. In addition, the time during which the equipment can operate is often limited, since a milking operation lasts only a few minutes, and the milk is subsequently immediately pumped to the milk tank. Here, a desired measurement as a function of a part of a herd is no longer possible, since the milk has been mixed with the milk of other animals.

It is therefore a drawback of these known methods that they are carried out either infrequently or can only take place in a relatively short time frame using expensive and sensitive equipment.

It is an object of the present invention to improve the method mentioned in the introduction.

This object is achieved by the invention by means of a method according to claim 1, in particular for managing a herd of a plurality of dairy animals, which herd comprises N groups of each at least one animal, in which N≥2, the method comprising A) determining a content of a substance in the milk for at least one, and in particular each, group of dairy animals, and B) performing an animal-related operation for the at least one, in particular for each, group, based on the content of the substance determined in the milk of said group, wherein the step of determining the content comprises:

A1) repeating the following steps at least N times:

a) performing at least one milking to obtain milk from at least one animal of the at least one group of dairy animals, wherein an amount of milk of the at least one milking is measured, b) performing at least one milking to obtain milk from at least one animal from another group of dairy animals from the herd, wherein an amount of milk of the at least one milking is measured, c) collecting all the milk of which the amount has been determined in steps a) and b), to form a bulk amount, d) determining a reference content of the substance in the bulk amount of milk using an external measuring device, and A2) determining the content of the substance in the milk of animals from the at least one group of dairy animals from the amount values measured in steps a) and b), as well as from the reference value, and using a predetermined assumption.

The invention is based on the idea that it is not necessary to measure the contents of the individual milk of an individual animal, but that it suffices to infer the effect, i.e. the contribution, of said milk from a plurality of amounts of milk to which said milk has contributed. In concreto, every bulk tank contains a contribution from the respective animal or the respective group of animals. For such bulk milk, there is significantly more measuring time available. By now suitably using several measurements from one or more bulk tanks and mathematical techniques, it is possible to reach relatively reliable conclusions about parts of the herd. The fact that no equipment is required at the milking devices themselves is a significant advantage. In particular on large farms with several milking devices, such as a milking carousel containing a few tens of milking devices, this would result in enormous costs.

In this case, the contents of substances are often the percentages of substances found in the milk. These may be substances which are always present in the milk, but also substances which are rarely present. Furthermore, the term "substance" should be interpreted broadly and also comprises, for example, somatic cells and the like. Reference contents are contents as determined for the respective bulk amount of milk by means of an external measuring device. As such external equipment is often much more accurate and reliable, the values determined thereby serve as reference values.

In this case, the "animal-related operation" is always an operation relating to a dairy animal, that is to say an operation which is to be performed on the dairy animal or the group of dairy animals and is intended to have an effect on the milk or the milking of the animals. This effect may be direct, such as a real milking operation, but also indirect, such as in relation to the health of the animals (udder or other), as will be explained in more detail below.

In this context, the term "milking" is understood to mean a milking of the dairy animal, in which all the available milk is obtained. In principle, incomplete milking operations, such as when a milking cup is kicked off or the like, may also be counted, but it cannot be ruled out that the contents from the (partial) milking will differ from those of a complete milking in the case of such an incomplete milking. Depending on the expected deviation, it is possible in this case to disregard either the respective milking or even the collected (bulk) amount. Incidentally, the expression "bulk amount of milk" is understood to mean an amount of milk from a plurality of milkings, preferably of many milkings, such as a few tens or even hundreds of milkings. Furthermore, the bulk amount of milk will, in practice, always contain milk of other group(s) of dairy animals. In theory, it is possible to collect the milk from the groups completely separately, but this is so laborious, particularly if it has to be repeated for a relatively long period of time, that it is not feasible in practice and certainly not intended in the present invention. In addition, this would be a trivial solution, since in that case the reference values represent the pure group value and therefore nothing has to be derived anymore. By contrast, with the present invention, it is intended that, even if milk from two or more groups is collected in one and the same bulk vessel, it is still possible to deduce something about the values of the individual groups.

In this context, the expression external measuring device is understood to mean a measuring device which is not intended to carry out measurements on milk which is still to reach the bulk tank, but is intended to perform measurements on the bulk milk. Such a measuring device may, for example, perform measurements in the bulk tank itself or on samples from said bulk tank. The samples may in turn have been taken directly from the bulk tank at the dairy farm or from the tank lorry or even at the milk factory. Therefore, the external measuring device may be provided at the dairy farm itself or completely externally, that is to say far away from the dairy farm/milking devices.

In this context, the expression "predetermined assumption" is understood to mean that an assumption is made beforehand about the contributions of the milk of the different animal groups and how these will develop. In order to produce a useful analysis, the number of unknowns cannot increase indefinitely. A more detailed explanation about the predetermined assumptions will be given below.

Particular embodiments are described in the dependent claims and in the following description. It should be noted that where the following description and claims mention "cows", this may also include other dairy animals, such as sheep, goats etc. However, for the sake of convenience, only "cows" are mentioned below.

In particular, at least one group is chosen from grazing cows, shed-reared cows, heifers (primiparous cows) and multiparous cows. It is known that the composition of the milk of each of these groups may differ from that of cows from other groups. As a result thereof, it is possible and sensible to analyse the milk of such groups according to the invention. It should be noted that, in case one or more contents of two groups is/are coincidentally identical, this will still automatically come to the surface. In addition, the information obtained about the milk may be useful when managing individual animal groups, because these may not only differ with regard to milk content(s), but also with regard to the best way in which to keep them. Incidentally, the herd can be divided into groups of 1 or more animals virtually as one pleases. However, in this case, a smaller number of groups will yield much more accurate results.

In embodiments, step A2) comprises regression analysis. In particular, step A2) comprises linear regression analysis. Regression analysis is a tried and tested way of determining the respective contents. In this case, use is made, for example, of a system of at least N equations where the contents per group are the unknowns and the one or more bulk contents, the respective bulk amount(s) and the milk yield per group per bulk amount are the knowns. All this will be explained in more detail below with reference to an example. Incidentally, other techniques for analysing the milk are not excluded.

In embodiments, the assumption comprises that said content for that (or each, as the case may be) group is independent of time. Advantageously, an assumption should be made regarding the effect which individual (milk) contributions have on the total milk, the bulk amount, in order to analyse the amounts of milk and their contents. The abovementioned approach is simple but useful, and assumes one or more contents to be constant for each group.

In alternative embodiments, the assumption comprises that said contents of different groups have a constant ratio. That is to say that, from one total amount to another total amount, the one or more contents of milk do not have to be constant for each animal group, but their ratio with respect to each other is. In other words, if certain external circumstances, such as temperature, have an effect on the contents, which will then not be independent of time, then the assumption here is that this effect is the same in terms of percentage for all groups. This offers ways of performing a slightly more accurate analysis, while the mathematical steps are still simple and quick. Obviously, other and more complicated assumptions are also possible.

In embodiments, step c) comprises collecting the milk of all milkings performed during a period of time of all groups in a bulk tank, wherein the amount of at least all groups and advantageously of all milkings is determined. For example, this comprises taking a bulk tank sample at different collected amounts of milk, such as at 500 litres, 1,000 litres, 2,000 litres, etc. This results in different amounts and different contributions of the different groups, so that the analysis according to the invention can be performed.

The bulk milk can be collected from different groups which all roam freely in one space and which are milked arbitrarily, provided that the identity of each animal is determined during milking, so that the associated group can also be determined. This is the case, for example, with robotised milking. It is also possible to keep the animals of one or more, or even of all, groups separately and to milk them separately. As a rule, this is possible if milking takes place in the conventional way and a group of animals is taken to the milking parlour. In al these cases, one milk meter is sufficient (per milking stall). However, it is also possible to use a plurality of milk meters, since the only thing which matters is the amount of milk which is milked per animal group.

Thus, in embodiments step c) furthermore comprises transporting the milk from the bulk tank to a milk processor, wherein step d) comprises determining the reference content by the milk processor. This is a natural and efficient embodiment, because it makes it possible to use the external measuring equipment of, for example, a dairy factory, since it receives the (bulk) milk and already measures it anyway. The measurements determine the pay-out and will thus be accurate and reliable. In addition, there is sufficient time for a measurement, because the milk is available at the factory for a relatively long period of time and, moreover, the dairy farmer does not have to do any work, because the dairy factory takes care of performing all of the respective measurements.

In embodiments, the steps which are at least repeated N times are performed successively in step A1). This means in particular that a measurement is carried out of at least N successive bulk tanks to determine the one or more contents. This gives a good impression of the contents. In addition, it is thus relatively easy to find a running average by using the N last bulk amounts in the analysis. Thus, the effect of managing measures can be checked.

In embodiments, the substance is milk protein, milkfat or lactose. These are often important substances in the milk, whose contents are often routinely determined in bulk milk. Nevertheless, it is of course possible to include any desired substances in the analysis, such as specific proteins, urea, free fatty acids (although these are less stable and can therefore be measured less accurately in the bulk), etc. With the present invention, the term "substances" also includes the term "somatic cells". Obviously, it is also possible not to include one or more bulk amounts when performing the measurements, for example because a tank has been contaminated, or for any other reason.

In embodiments, the animal-related operation comprises setting a milking parameter, in particular on one or more milking devices which are used to milk one or more dairy animals of the herd. Setting is carried out in particular for the respective animal group. By setting such a milk parameter, it may be possible to exert a direct influence on the milk, so that the measurements according to the present invention have an effect which is as great as possible. In particular, the milk setting comprises a disconnection threshold at which, when an animal's flow of milk drops below this disconnection threshold, a milk cup is disconnected from a teat of the dairy animal. This is an example in which setting a parameter, per group of animals, can have a direct effect. After all, the fat content of milk during a milking depends slightly on how much milk has already been milked from the teat, with the fat content generally tending to show an increase towards the end of a milking operation. On the other hand, the average milking speed drops near the end of a milking operation, so that it may be advantageous to strive for an optimum. The present invention may then, for example, help to find an optimum combination of total average milking speed (i.e. capacity of the milking device in litres/day) and the total kilograms of milkfat. Obviously, other milking settings are also possible, such as milking vacuum, pulsation frequency, etc.

In embodiments, the animal-related operation comprises setting a parameter of a feed device. The feed device is obviously intended to provide feed to one or more of the dairy animals, in particular from the respective group of animals. This means that a parameter for the feed device can be set for these animals on the basis of a content which is determined for the respective group of animals, so that the feed of these animals is modified. Again, it is thus possible to pass on feedback to the animals on the basis of the achieved content. In particular, the feed setting comprises a composition or daily amount of feed to be given to the group of dairy animals. It is in particular the amount and composition of the feed which can have a significant effect on the production and composition of milk. Thus, (concentrated) feed may, up to a certain additional amount, also result in production of additional milk, while certain combinations may also result in a (slightly) different composition of the milk, such as a different fat/protein ratio. All such settings can be tested in a simple manner by means of the invention without having to purchase additional equipment.

The invention furthermore relates to a milking system according to claim 11, in particular for milking a plurality of dairy animals which are divided into a plurality of groups, wherein the milking system comprises:
  a milking device which is configured to perform milkings in order to obtain milk from the dairy animals,
  a bulk tank connected to the milking device for collecting the milk from the milkings of dairy animals at least for a period of time,
  at least one milk meter which is configured to determine an amount of milk obtained per milking and/or per group of dairy animals, and
  a control unit which is configured to receive data relating to a content of a substance in the milk in the bulk tank, and which is furthermore configured to perform a method according to the invention.

This system is able to provide the advantages as have already been described above for the method according to the invention. These advantages will not be described again here. However, it should be noted that, if only one milk meter is provided, this will obviously be used for all animal groups. There will then in principle only be one milking stall/milking device. The animal groups are then milked in succession, optionally mixed. However, it is also possible to keep animal groups physically separated and also to milk them physically separated, in that case preferably using a plurality of milk meters, such as one or more per animal group.

In embodiments, the milking device has an adjustable parameter and the control unit is configured to set the parameter on the basis of the determined content. As has already been indicated above, this may relate to, for example, a disconnection threshold for a flow of milk per teat or udder, or also a milking vacuum, pulsation frequency, etc.

Obviously, a plurality of milking devices may be provided. The setting determined for the respective animal group on the basis of the contents measured thereby can in this case be applied each time an animal from the animal group is being milked.

In embodiments, the milking system furthermore comprises a feeding system for feeding at least one of the plurality of groups, which feeding system has an adjustable parameter and in which the control unit is configured to set the parameter on the basis of the determined content. In particular, the feeding system comprises a concentrate station or a minerals-metering station. These are outstandingly suitable for influencing the feeding of an animal or animal group due to their significant effect on the milk yield, both in terms of quantity and quality. In addition, it is often the case that roughage is provided ad libitum, so that dosing it is much more complicated.

In embodiments, the control unit is provided with a communication device for automatically receiving said content from an external party, in particular a milk processor. In this case, the communication device comprises, for example, a telephone, modem or other telecommunication connection, in particular also one which is suitable for an internet connection. Via such a connection, it is possible to automatically receive the data relating to the one or more contents, so that these can then be processed in combination with the data on amounts of milk from the animal groups, in order to arrive at an individual content or a content per animal group.

The invention will now be explained in more detail with reference to the drawing, in which the sole figure shows an example of the invention in a highly diagrammatic form.

FIG. 1 shows an animal shed 10 containing first animals 11 and second animals 12 which can be milked at a milking stall 13 using a milking device 14 with milk cups 15, from where the milk passes through milk meter 17 to a milk tank 18 via the milk line 16, under the control of control unit 19.

Reference numeral 20 denotes a feed device, reference numeral 3 denotes supplies of feed 21 and a feed trough 22.

Furthermore, reference numeral 23 denotes a milk tanker which takes bulk milk to a milk factory 24 with analysing equipment 25.

In the illustrated animal shed 10, there are first animals 11, such as first-calf cows, and second animals 12, such as multi-calf cows. It is expected that the composition of the milk from these cows will differ. Other divisions, such as between cows which are allowed to graze and cows which are not allowed to graze, are also possible, as are divisions into more than two groups.

In practice, the first and second animals 11 and 12 will be milked at the milking stall 13 by means of the milking device 14, which is only illustrated here in a highly diagrammatic form. This may be either a milking robot with automatic connection or a conventional milking device with manual connection of the milk cups 15. The milk cups obtain the milk from the animal and this milk is transported to the milk collection point in the form of a milk tank 18 via the milk line 16. The milk meter 17 determines the amount of milk for each milking operation of an animal 11, 12 which is stored by the control unit 19.

In this embodiment, the animals of the two groups are mixed and free to roam. It is also possible to keep the animal groups separate, for example in different animal sheds, because they also need to be kept under other, different conditions. Even then, all animals can still be milked using the same milking device 14, although that requires a few more animal displacements. In addition, it is possible to provide one or more milking devices and milk meters for each animal shed. It is immaterial where the milk meters are situated and how the animals of the herd are milked, as long as it is possible to determine how much milk each individual animal group has given.

Milk from the first and second animals will be mixed and arrive at the milk tank 18. Every 2 to 3 days, this bulk milk is taken to a milk factory 24 by means of a milk tanker 23. This takes a sample of the bulk milk, for example at the milk tank 18, or the sample is taken in the milk factory. The milk sample is subsequently analysed by means of the analysing equipment 25. This accurately determines, for example, the fat, protein and lactose contents of the bulk milk, as reference values. These contents may be passed onto the control unit 19 in various different forms, such as on paper and subsequently entered manually, or also via a telecommunications connection, such as via Internet. This is indicated by the dashed line. This has the advantage that the data are processed automatically and thus as quickly as possible.

In addition, the total amount of milk will be measured in the milk factory 24 and/or at the animal shed 10/milk tank 18. In addition, the total milk yield per animal group will also be known when the individual milk yields of the first and second animals, respectively, which are stored in the control unit, are added up.

By then analysing at least as many sets of reference values with amount values as there are groups of animals, the contributions of each group of animals to the measured reference values can be calculated, namely without measuring equipment (contrary to the amount) in the animal shed 10. On the basis of the measured values, it is then possible, for example, to adjust the composition of the feed given to a certain animal group. For example, more concentrate or more minerals are given in order to increase one or more contents with this group or, on the contrary, less is given because the content is already so high that the feed can be used more efficiently for another animal group. It is also possible for the milking method to be adjusted by the control unit, such as a lower disconnection threshold at which milking is discontinued. This generally results in a higher fat content of the milk, but takes slightly more time, which could have an adverse effect on the capacity of the milking device 14. Nevertheless, data are thus obtained according to the invention which may be useful when managing the herd of dairy animals.

An example of the values is as follows:

First bulk milk tank (3450 litres) contains 4.363% fat and 3.464% protein.

Group 1 supplied 1650 litres and group 2 supplied 1800 litres.

Second bulk milk tank (4000 litres) contains 4.356% fat and 3.456% protein.

Group 1 supplied 2100 litres and group 2 supplied 1900 litres.

Analysis using 2 equations with 2 unknowns for each content gives the following results:

$1650 \cdot v1 + 1800 \cdot v2 = 3450 \cdot 4.363$
$2100 \cdot v1 + 1900 \cdot v2 = 4000 \cdot 4.356$
and
$1650 \cdot e1 + 1800 \cdot e2 = 3450 \cdot 3.464$
$2100 \cdot e1 + 1900 \cdot e2 = 4000 \cdot 3.456$, in which $v1$ and $v2$ are the fat contents of the first and second animals, respectively, and $e1$ and $e2$ are the protein contents of the first and second animals, respectively.

Solving yields the following results:
$v1 = 4.28\%$
$v2 = 4.44\%$
$e1 = 3.37\%$
$e2 = 3.55\%$.

In this case, the assumption was made that the contents do not change over time. With other assumptions, the analysis has to be modified accordingly. Furthermore, it is possible to perform the same analysis for a plurality of amounts, so that the figures obtained become more reliable.

The invention claimed is:

1. A method for managing a herd of a plurality of dairy animals, which herd comprises N groups of each at least one animal, in which $N \geq 2$, the method comprising:
    A) determining a content of a substance in the milk for at least one group of dairy animals; and
    B) performing an animal-related operation for the at least one group, based on the content of the substance determined in the milk of the group;
    wherein the determining the content (A) comprises:
    A1) repeating the following operations at least N times:
        a) performing at least one milking to obtain milk from at least one animal of the at least one group of dairy animals, wherein an amount of milk of the at least one milking is measured,
        b) performing at least one milking to obtain milk from at least one animal from another group of dairy animals from the herd, wherein an amount of milk of the at least one milking is measured,
        c) collecting all the milk of which the amount has been determined in a) and b), to form a bulk amount,
        d) determining a reference content of the substance in the bulk amount of milk; and
    A2) determining the content of the substance in the milk of animals from the at least one group of dairy animals from the amounts measured in a) and b), and from the reference content, and using a predetermined assumption,
    wherein the predetermined assumption comprises that content for the at least one group is independent of time or that contents of different groups have a constant ratio.

2. A method according to claim 1, wherein the at least one group is chosen from grazing cows, shed-reared cows, heifers, or multiparous cows.

3. A method according to claim 1, wherein A2) comprises regression analysis or linear regression analysis.

4. A method according to claim 1, wherein the predetermined assumption comprises that content for the at least one group is independent of time.

5. A method according to claim 1, wherein the predetermined assumption comprises that contents of different groups have a constant ratio.

6. A method according to claim 1, wherein c) comprises collecting the milk of all milkings performed during a period of time of all groups in a bulk tank, wherein the amount of at least all groups and of all milkings is determined.

7. A method according to claim 6, wherein c) further comprises transporting the milk from the bulk tank to a milk processor, and wherein d) comprises determining the reference content by the milk processor.

8. A method according to claim 1, wherein the substance is milk protein, milkfat, or lactose.

9. A method according to claim 1, wherein the animal-related operation comprises setting a milking parameter, a disconnection threshold at which, when an animal's flow of milk drops below the disconnection threshold, a milk cup is disconnected from a teat of the dairy animal.

10. A method according to claim 1, wherein the animal-related operation comprises setting a parameter of a feed device, of a composition or daily amount of feed to be given to the group of dairy animals.

11. A milking system for milking a plurality of dairy animals which are divided into a plurality of groups, the milking system comprises:
   a milking device configured to perform milkings to obtain milk from the dairy animals;
   a bulk tank connected to the milking device for collecting the milk from the milkings of dairy animals at least for a period of time;
   at least one milk meter configured to determine an amount of milk obtained per milking and/or per group of dairy animals; and
   a control unit configured to receive data relating to a content of a substance in the milk in the bulk tank, and which is further configured to perform a method according to claim 1.

12. A milking system according to claim 11, wherein the milking device includes an adjustable parameter, and wherein the control unit is configured to set the adjustable parameter based on the determined content.

13. A milking system according to claim 11, further comprising a feeding system for feeding at least one of the plurality of groups, which feeding system includes an adjustable parameter, and wherein the control unit is configured to set the adjustable parameter on the basis of the determined content.

14. A milking system according to claim 11, wherein the control unit includes a communication device for automatically receiving the content from an external party.

* * * * *